Patented Nov. 13, 1934

1,980,599

UNITED STATES PATENT OFFICE 1,980,599

PROCESS FOR THE PRODUCTION OF RUBBER LATEX CONCENTRATES

Paul Scholz, Frankfort-on-the-Main, Germany, assignor to Revertex Limited, London, England, a corporation of England No Drawing. Application January 25, 1932, Serial No. 588,811. In Germany January 29, 1931

9 Claims. (Cl. 18—50)

This invention relates to a process for the production of rubber-latex concentrates.

Various proposals have already been made for concentrating rubber latices, especially by evaporating, filtering, centrifuging and creaming, the limits to which the concentration could be carried without coagulation having been substantially extended by the addition of protective colloids. On the industrial scale, the most highly concentrated rubber latices have hitherto been prepared by evaporation in presence of protective colloids. In addition to the concentration, the stability of the inspissated rubber latices plays an important part in relation to their utilization in practice, and it has been found that, in the case of the concentrates prepared by evaporation in presence of protective colloids, such as soap, this stability can be very considerably increased, and coagulation during preparation reliably prevented, by ensuring the presence, within comparatively narrow limits, of a free, strong non-volatile alkali, preferably potassium hydroxide, in the concentrate. Experience has shown that, as regards the production of concentrates containing 70-85% of dry substance, the preparation is effected in the most economical manner, and the highest stability is manifested, when the content of free strong non-volatile alkali is between 80 and 180 milli-equivalents, and preferably between 85 and 145 (e. g. 120) milli-equivalents per kilogram of concentrate. The best results are obtained with concentrations lying between 115 and 125 milliequivalents per kg. concentrate. The term "free strong non-volatile alkali" employed herein is intended to denote that content of alkali which is found when, for example, the concentrate, diluted with water to about 60 times its volume, is titrated with decinormal sulphuric acid, in presence of an indicator, such as bromothymol blue, which changes colour in the vicinity of the neutral point (pH=7), the resulting alkali content being then referred to the undiluted concentrate.

The titration may be suitably performed in the following manner:

10 grms. of the concentrate are weighed out and diluted to 250 cc. in a measuring flask, and 25 cc. of the resulting solution, corresponding to 1 grm. of originating material, are employed for the titration. For this purpose they are diluted to 60-70 cc. in a 200 cc. glass beaker, and after the addition of a few drops of bromothymol blue, are titrated with decinormal sulphuric acid, while being continuously stirred with a glass rod. A drop of the indicator is added to the liquid from time to time. The colour of the indicator is most clearly visible at the moment when it spreads over the surface of the liquid. The moment when the colour of the indicator begins to change from green to yellow is considered the end point of the titration. In this method, 1 cc. of sulphuric acid consumed corresponds to 100 milli-equivalents of alkali per kg. of concentrate, so that no troublesome calculation is needed.

The present invention is based on the observation that, under ordinary conditions of preparation (in which infection prior to sealing the packing unit is not, or cannot be, carefully prevented) an insufficiency of free alkali will no longer ensure safe transport and stability, since such a small amount of alkali cannot sufficiently restrict the growth of bacteria. On the other hand, an excessive content of alkali has a chemically injurious effect on the non-rubber constituents of the latex during concentration, so that the final product can no longer be regarded as practically unaltered inspissated latex. Such injurious action finds expression, for example, in lowered or increased viscosity. The new discovery that both an excessive and insufficient content of alkali are injurious has, for the first time, enabled the optimum alkali content to be determined in each case.

The hereindescribed process is preferably carried out by treating the tapped latex with a portion of the alkali that is required in accordance with the invention, before it is passed to the concentrating plant, the amount of free alkali being then ascertained by titration, and, on the basis of the results, increased to the quantity needed to impart to the concentrate the most suitable concentration of free alkali for its production and stability.

Since excess of alkali during the concentration is injurious, the amount of added alkali is preferably kept so small as to prevent the alkali from attaining concentrations exceeding the specified limit. Should it be found, after the concentration, that the final concentration of the alkali is below the specified range, it is increased to the requisite value by careful additions of alkali.

The following is a practical, approximation method of calculating the amount of alkali which must be added in order to attain the desired concentration of alkali in the latex to be concentrated.

If $a$ be taken to represent the amount, in litres, of rubber latex to be concentrated, and $b$ the percentage of dry substance therein, and if, after about tenfold dilution with water, 5 cc. of the latex require c cc. of decinormal sulphuric acid when titrated with bromothymol blue as indicator, and, further, if d be taken to represent the normality of the KOH to be employed as the added alkali, the amount, in litres, of KOH solution to be added will be found by the formula $$\frac{0.9b - 10c}{495d} a.$$

The most favourable concentrations of free alkali may differ from one plantation to another, and also, in one and the same plantation, under different conditions as regards, for example, the time of year, and in wet and dry seasons, and are influenced, inter alia, by the protein content of the rubber particles, the concentration of the latex at the time of tapping, and the other chemical characteristics of the material. In general, however, they lie within the limits set forth.

It sometimes happens that the alkali content of a concentrate, though coming within the aforesaid optimum range at the time of preparation, falls, during storage, below the minimum needed for stability, probably as the result of reaction between the alkali and the protein of the rubber latex. The decline in the alkali content destroys the stability of the concentrate, since it can no longer offer the necessary resistance to the action of bacteria. The stability may, however, be restored by adding sufficient fresh alkali to bring the content thereof back to the requisite level.

Finally, ammonia also may be added (as is often done) to the concentrate prepared in accordance with the invention. Since the process of the present invention is substantially concerned with providing the concentrate with a hydroxyl-ion concentration lying between specified limits, or in other words to impart a pH value lying between corresponding limits, the addition of such a weak base as ammonia to a concentrate containing a strong base such as KOH, has no appreciable influence, since, under the circumstances, the dissociation of the ammonia is practically suppressed entirely.

*Example*

450 litres of rubber latex containing 38% of dry substance and having been treated, prior to dispatch to the concentrating plant, with such a quantity of KOH that 2 cc. of decinormal sulphuric acid were consumed in titrating 5 cc. of the latex in presence of bromothymol blue, are treated with 1.84 litres of 7x normal KOH and 3 kg. of coconut oil soap. The mixture is then concentrated, in a rotary-drum evaporator of the kind described in specification No. 1,670,900, so as to contain 75% of dry substance. The cooled, concentrated latex is then titrated for free alkali, with bromothymol blue as indicator. Should the ascertained alkali content be less than 115–125 milli-equivalents per kg. of concentrate it is made up to that figure.

Given proper treatment, rubber latex concentrates rendered stable in accordance with the invention, will keep for years without coagulating.

I claim:—

1. A process for the production of rubber-latex concentrates with a content of 70–85% of dry substance by evaporation in the presence of protective colloids and free strong non-volatile alkali in which the content of the alkali is so adjusted that titration of a sample of the concentrate after about 60-fold dilution in volume and in the presence of an indicator the inversion point of which is in the vicinity of the neutral point (i. e. at pH=7) reveals a free-alkali content of 80 to 180 milli-equivalents per kg. of the concentrate.

2. A process for the production of rubber latex concentrates with a content of 70–85% of dry substance by evaporation in the presence of protective colloids and free strong non-volatile alkali in which the content of the alkali is so adjusted that titration of a sample of the concentrate after about 60-fold dilution in volume and in the presence of an indicator the inversion point of which is in the vicinity of the neutral point (i. e. at pH=7) reveals a free-alkali content 85 to 145 milli-equivalents per kg. of the concentrate.

3. A process for the production of rubber latex concentrates with a content of 70–85% of dry substance by evaporation in the presence of protective colloids and free strong non-volatile alkali in which the content of the alkali is so adjusted that titration of a sample of the concentrate after about 60-fold dilution in volume and in the presence of an indicator the inversion point of which is in the vicinity of the neutral point (i. e. at pH=7) reveals a free alkali content of 115–125 milli-equivalents per kg. of the concentrate.

4. A process for the production of rubber-latex concentrates with a content of 70–85% of dry substance by evaporation in the presence of protective colloids and potassium hydroxide in which the content of the alkali is so adjusted that titration of a sample of the concentrate after about 60-fold dilution in volume and in the presence of an indicator the inversion point of which is in the vicinity of the neutral point (i. e. at pH=7) reveals a free-alkali content of 80 to 180 milli-equivalents per kg. of the concentrate.

5. A process for the production of rubber latex concentrates with a content of 70–85% of dry substance by evaporation in the presence of protective colloids and free strong non-volatile alkali in which the content of the alkali is so adjusted that titration of a sample of the concentrate after about 60-fold dilution in volume and in the presence of bromothymol blue reveals a free alkali content of 80 to 180 milli-equivalents per kg. of the concentrate.

6. A process for the production of rubber latex concentrates with a content of 70–85% of dry substance by evaporation in the presence of protective colloids and free strong non-volatile alkali in which the content of the alkali is so adjusted that titration of a sample of the concentrate after about 60-fold dilution in volume and in the presence of an indicator the inversion point of which is in the vicinity of the neutral point (i. e. at pH=7) reveals a free-alkali content of 80 to 180 milli-equivalents per kg. of the concentrate, part of the alkali being added before and the rest after effecting the concentration.

7. A process for the production of rubber latex concentrates with a content of 70–85% of dry substance by evaporation in the presence of protective colloids and a free strong non-volatile alkali which comprises so adjusting the content of the alkali that a sample of the concentrate after about 60-fold dilution in volume and in the presence of an indicator the inversion point of which is in the vicinity of the neutral point (i. e. at pH=7) reveals a free alkali content of 80 to 180 milli-equivalents and compensating small losses of alkali which occur during standing by successive additions of alkali.

8. A process for the production of rubber latex concentrates with a content of 70–85% of dry substance by evaporation in the presence of protective colloids and a free strong non-volatile alkali which comprises so adjusting the content of the non-volatile alkali that a sample of the concentrate after about 60-fold dilution in volume and in the presence of an indicator the inversion point of which is in the vicinity of the neutral point (i. e. at pH=7) reveals a free alkali content of 80–180 milli-equivalents and adding ammonia.

9. A rubber latex concentrate containing 70–85% of dry substance, protective colloids and a free strong non-volatile alkali in such quantities that a titration of a sample of the concentrate after 60-fold dilution in volume and in the presence of an indicator the inversion point of which is in the vicinity of the neutral point (i. e. pH=7) reveals a free alkali content of 80–180 milli-equivalents per kg. of concentrate.

PAUL SCHOLZ.